United States Patent Office 3,228,938
Patented Jan. 11, 1966

3,228,938
PYRAZINOANTHRAQUINONE DYES AND
PROCESS
Fritz Graser, Ludwigshafen (Rhine), Germany, assignor to Badische Anilin- & Soda-Fabrik Aktiengesellschaft, Ludwigshafen (Rhine), Germany
No Drawing. Filed June 19, 1962, Ser. No. 203,439
Claims priority, application Germany, Sept. 3, 1960, B 59,221; Mar. 30, 1961, B 61,967
6 Claims. (Cl. 260—262)

This is a continuation-in-part of application Serial No. 134,112, filed August 28, 1961, now abandoned.

This invention relates to new grey dyes of the pyrazino-anthraquinone series and to a process for their production.

It is known to prepare yellow to red and blue to violet vat dyes of the pyrazino-anthraquinone series by causing organic amino compounds to act on Pz-dihydroxypyrazino-anthraquinone at elevated temperature, and advantageously adding dehydrating agents, such as zinc chloride, boric acid, sodium bisulfate or aqueous copper sulfate. The amine component must be used in a great excess, for example 2.5 to 30 times the molar amount, with reference to the Pz-dihydroxypyrazino-anthraquinone. This method is consequently uneconomical when expensive amines are used. Moreover, weakly basic amines or amine components which are decomposable at an elevated temperature, such as aminoanthraquinones, or arylamines which contain sulfonamide groups, cannot be reacted by this method. Often the dyes obtained by this method are insufficiently pure and must subsequent be purified.

It is furthermore known that organic amines can be reacted with Pz-chlorhydroypyrazino-anthaquinone to prepare the said dyes. However the anthraquinone derivative must be prepared previously in a special process and separate reaction vessel from Pz-dihydroxy-1,2-pyrazino-anthraquinone by reaction with an excess of phosphorus oxychloride, and isolated. Resinous, dark byproducts are always formed, from which the product must be filtered off while hot. The Pz-chlorhydroxypyrazino-anthraquinone then crystallizes from the cooled reaction mixture only in small yields. Because of the very defective method of preparation of Pz-chlorrydroypyrazino-anthraquinone, the said process has not acquired any technical importance.

It is an object of the present invention to provide unitary grey vat dyes and a simple process for their production. Only a few unitary grey vat dyes have hitherto been known and in many cases they have inadequate fastness, especially unsatisfactory leveling power, and sometimes they can only be prepared with difficulty. There are a large number of dye preparations giving grey dyeings and consisting of mixtures of various vat dyes and having good fastness properties. Such mixtures have the disadvantage, however, that the individual components do not usually have the same absorptivity and therefore different shades are obtained with varying dyeing conditions. There was therefore a need for unitary grey dyes which level well and which have good all around fasteness. This need is met by the present invention.

I have found that compounds of the general formula:

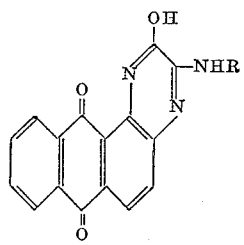

in which R represents the radical of a 2-substituted 1,4-diaminoanthraquinone attached by way of the 4-amino group, and to which further six-membered ring systems may be anellated in 1,2-position, the amino group in 1-position being part of this anellated ring system, are grey dyes which level well and are fast to light and wet.

I have further found that the said dyes can be readily prepared by reacting Pz-dihydroxy-1,2-pyrazino-anthraquinone with a halogenating agent in an inert organic solvent or diluent in the presence of a tertiary organic amine or low molecular weight carboxylic acid amide and treating the Pz-chlorhydroxy-1,2-pyrazino-anthraquinone in the same reaction medium, from which if desired any excess of halogenating agent has been removed, with an amine of the general formula:

R—NH₂ in which R has the meaning given above, or by treating a mixture of Pz-dihydroxy-1,2-pyrazino-anthraquinone and said amine of the formula:

R—NH₂ in an inert organic solvent in the present of a tertiary amine or a low molecular weight carboxylic acid amide with a halogenating agent.

The reaction of the Pz-dihydroxy-1,2-pyrazino-anthraquinone to the dye may also be carried out after adding all the components and in the same reaction vessel.

As initial material, Pz-dihydroxy-1,2-pyrazino-anthraquinone which is unsubstituted in the anthraquinone nucleus of the formally equivalent Formula I or II:

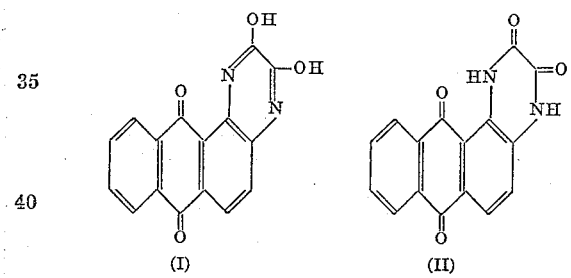

(I)                    (II)

may be used for example.

Tertiary amines in the presence of which the reaction should be carried out include triethylamine, tri-n-propylamine, N-dimethylcyclohexylamine and pyridine. Low molecular weight carboxylic acid amides are of especially good activity. Formamides are especially suitable, for example dimethylformamide, diethylformamide, formic acid morpholide or piperidide. Lactams, for example N-methyl- or N-ethylpyrrolidone-(2) may also be used. As halogenating agents, for example thionyl chloride, phosphorus trichloride, phosphorus oxychloride, phosgene or mixtures of these may be used. Amines of the general formula:

R—NH₂ which are to be reacted with the Pz-dihydroxy-1,2-pyrazino-anthraquinone include 1,4-diamino-2-acetylanthraquinone,
1,4-diamino-2-benzoylanthraquinone,
1,4-diamino-2-benzoxalyl-(2′)-anthraquinone,
1,4-diamino-2-benzthiazolyl-(2′)-anthraquinone,
2-(1′,4′-diamino-2′-anthraquinonyl)-5-phenyl-1,3,4-oxdiazole,
2-(1′,4′-diamino-2′-anthraquinonyl)-5-(2′-chlorophenyl)-1,3,4-oxdiazole,
2-(1′,4′-diamino-2′-anthraquinonyl-5-(3′-chlorophenyl)-1,3,4-oxdiazole,
2-(1′,4′-diamino-2′-anthraquinonyl)-5-(4′-chlorophenyl)-1,3,4-oxdiazole, 2-(1',4'-diamino-2'-anthraquinonyl)-5-(anthraquinonyl-2')-1,3,4-oxdiazole,
2-(1',4'-diamino-2'-anthraquinonyl)-5-(2'5'-dicholorphenyl)-1,3,4-oxdiazole,
2-(1',4'-diamino-2'-anthraquinonyl)-5-(2',4'-dichlorophenyl)-1,3,4-oxdiazole,
2-(1',4'-diamino-2'-anthraquinonyl)-5-(3',4'-dichlorophenyl)-1,3,4-oxdiazole,
2-(1',4'-diamino-2'-anthraquinonyl)-5-(3'-methylphenyl)-1,3,4-oxdiazole,
2-(1',4'-diamino-2'-anthraquinonyl)-5-(4'-methylphenyl)-1,3,4-oxdiazole,
2-(1,4-diamino-2'-anthraquinonyl)-5-methyl-1,3,4-oxdiazole,
2-(1',4'-diamino-2'-anthraquinonyl)-5,6-phthaloyl-benzoxazole,
2-(1',4'-diamino-2-'-anthraquinonyl)-5,6-phthaloyl-benzothiazole,
2-amino-3,4-phthaloyl-acridone,
2-amino-3,4-phthaloyl-6-chloracridone,
2-amino-3,4-phthaloyl-7-chloracridone,
2-amino-3,4-phthaloyl-5,7-dichloracridone
and 2-amino-3,4-phthaloyl-6,7-dichloracridone.

By inert solvents I mean those which are not changed under the reaction conditions and do not interfere with the reaction to the dyes.

For the preparation of the Pz-chlorhydroxypyrazino-anthraquinone, about 1 to 5 moles, especially 1 to 2 moles, of halogenating agent are used per 1 mole of Pz-dihydroxypyrazino-anthraquinone. The amounts of tertiary amine or low molecular weight carboxylic acid amide may be from catalytic amounts up to about 5 moles, preferably about 1.0 to 2.5 moles per mole of Pz-dihydroxypyrazino-anthraquinone. The reaction temperature may lie between about 40° and 200° C. It depends on the nature of the tertiary organic amine or the low molecular weight carboxylic acid amide and also on the nature of the halogenating agent used. When using tertiary organic amines, the reaction temperature may lie for example between 100° and 160° C. When a low molecular weight carboxylic acid amide is used and thionyl chloride or phosphorus oxychloride is used as the halogenating agent, it is possible to halogenate below 100° C., for example between 60° and 80° C. When using a low molecular weight carboxylic acid amide and phosgene, halogenation begins at about 40° C.

For the halogenation, the Pz-dihydroxypyrazino-anthraquinone in an inert organic solvent or diluent, as for example nitrobenzene, o-dichlorobenzene, trichlorobenzene or naphthalene, may be brought together with the tertiary amine or the low molecular weight carboxylic acid amide and the halogenating agent at room temperature, or the two latter substances may be added at a somewhat elevated temperature, for example, between 40° and 160° C., and the whole then kept for about one quarter to three hours at a temperature of about 40° to 200° C. as specified above for the halogenation until the formation of the Pz-chlorohydroxypyrazino-anthraquinone has been completed. This is clearly evidenced in the change of the microscopic picture of the undissolved material. Usually complete solution of the initial material takes place at higher reaction temperatures.

The Pz-chlorohydroxypyrazino-anthraquinone thus formed is not isolated but is directly reacted further with amines, for example by stirring the amine with the general formula: H₂N—R (R having the meaning given above) into the reaction mixture at the halogenation temperature or at the temperature which is necessary for the further reaction, or also at a lower temperature, for example room temperature, and then keeping the reaction mixture at a temperature between about 70° C. and the boiling point of the solvent or diluent, especially at 130° to 180° C. until the formation of the dye is completed. Prior to the further reaction of the reaction mixture containing the Pz-chlorhydroxypyrazino-anthraquinone with the amines of the general formula H₂N—R, any excess of halogenating agent used may be removed by purging with inert gases, such as air, carbon dioxide or nitrogen, or by distilling off under reduced pressure. This gives better dye yields in many cases, for example, when thionyl chloride and especially phosgene has been used as the halogenating agent. The dye is isolated in the usual way and is formed in good yields and is of good purity.

The amount of amine required for the new process is far less than in prior methods in which the preparation of the said dyes could also be carried out in one and the same reaction vessel and which also started from Pz-dihydroxypyrazino-anthraquinone. It is only necessary to use equimolar to 1.5 molar amounts of amine, preferably an excess of 1 to 10%, with reference to the Pz-dihydroxypyrazino-anthraquinone.

When using an amine of poor solubility it is even advantageous to use less than the equimolar amount of amine. The amine is then completely used up. The excess of Pz-chlorohydroxypyrazino-anthraquinone may easily be removed by washing out with a warm to hot inert solvent. The dye obtained is very pure and has good fastness properties.

If amines of poor solubility are used in equimolar amounts or in excess, the crude dye is usually contaminated by unreacted amine because the unreacted amine of poor solubility can only be removed with difficulty by simple washing out with an organic solvent, even at an elevated temperature, for example by fractionation from concentrated sulfuric acid. By amines with poor solubility we mean amines which dissolve only to a very slight extent in inert organic solvents or diluents, such as are used in the reaction, as for example nitrobenzene, o-dichlorobenzene, trichlorobenzene or naphthalene, even at an elevated temperature, for example, at 100° to 150° C. They mainly have more or less highly condensed ring systems and are derived for example from anthraquinone and acridone. Amines which do not have poor solubility may also be used in less than the equimolar amount.

The amines having poor solubility are advantageously used in half-molar up to only very slightly less than equimolar amounts, especially 0.90 to 0.99 molar amounts, with reference to the Pz-dihydroxypyrazino-anthraquinone. In many cases it is convenient, especially when using 2-(1',4'-diamino-2'-anthraquinonyl)-phthaloyl-benzoazoles or -thiazoles, to stir the amine for some time, for example 1 to 5 hours, at an elevated temperature, for example 100° to 200° C., prior to the reaction. These amines are then better dispersed and react more easily.

Instead of first preparing the Pz-halogenhydroxypyrazino-antharquinone and then further reacting this in the same reaction medium to form the dye as above described, these two operations may also be combined in one operation, for example by adding from the start not only the Pz-dihydroxypyrazino-anthraquinone but also the amine H₂N—R to be reacted. In this way the said dyes can be prepared directly in one step and in the same reaction vessel from Pz-dihydroxypyrazino-anthraquinone.

This is especially surprising when phosgene or thionyl chloride is used as halogenating agent.

The new dyes of the 1,2-pyrazino-anthraquinone series can be prepared on a commercial scale by the process according to this invention.

The dyes obtainable according ot the present invention have excellent dyeing properties. Grey unitary vat dyes are obtained which are suitable for dyeing and printing fibrous material of a great variety of kinds, especially cotton, linen, rayon and rayon staple, but also wool, silk and articles of polyamides, polyurethanes and also polyesters. Articles of polyamides, for example polycaprolactam, or articles of polyesters, for example polyethylene glycol terephthalate or poly-4,4-dimethylolcyclohexane terephthalate, and articles of polyurethane include fibers, flock, threads, woven fabrics, knitted fabrics, films and sheets. The dyes may be used for dyeing and printing in the form of the leuco sulfuric acid esters which may be prepared by the usual methods.

The invention is illustrated by, but not limited to, the following examples. The parts are by weight.

Example 1

A mixture of 480 parts of anhydrous nitrobenzene, 29.2 parts of Pz-dihydroxy - 1,2 - pyrazino-anthraquinone, 11 parts of dimethyl formamide and 48 parts of thionyl chloride is heated for an hour at 100° C., the excess of thionyl chloride together with about 60 parts of nitrobenzene is distilled off under reduced pressure, 29.5 parts of 1,4-diamino-2-acetyl-anthraquinone added at about 90° to 100° C., the whole heated to 150° to 155° C. and kept for 1½ hours at this temperature. After cooling to about 90° to 100° C., the product is filtered and worked up as usual. A dye of the formula:

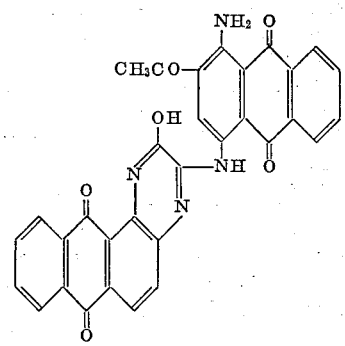

is obtained in a good yield; it dyes cotton grey shades with good fastness.

By using 37.5 parts of 1,4-diamino-2-benzoxazolyl-(2')-anthraquinone instead of 29.5 parts of 1,4-diamino-2-acetylanthraquinone, the dye of the formula:

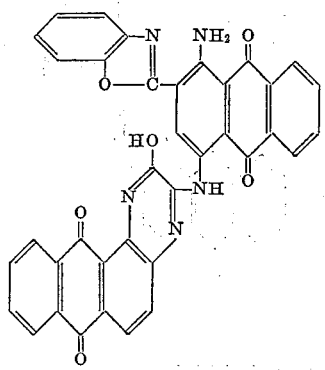

is obtained in a good yield; it dyes cotton from the vat with good fastness in full grey shades.

The grey dyes of the formulae:

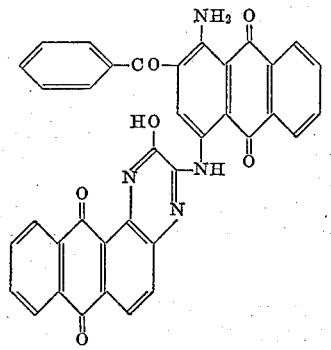

and

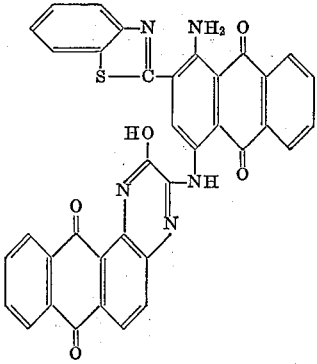

are obtained in the same way by using 34.2 parts of 1,4-diamino-2-benzoyl-anthraquinone and 37.1 parts of 1,4-diamino-2-benzthiazolyl-(2')-anthraquinone respectively.

Example 2

A mixture of 19.3 parts of Pz-dihydroxy-1,2-pyrazino-anthraquinone, 216 parts of anhydrous nitrobenzene, 7.3 parts of dimethylformamide and 32 parts of thionyl chloride is stirred for an hour at 100° C., the excess thionyl chloride together with about 60 parts of nitrobenzene distilled off under reduced pressure, and an anhydrous suspension of 22.5 parts of 2-amino-3,4-phthaloylacridone in 360 parts of nitrobenzene added at about 50° to 60° C., the whole heated to 180° C. to 190° C. and further stirred at this temperature for about six hours. After cooling to 100° to 110° C., the product is filtered on a suction filter heated with steam at normal pressure, washed with hot nitrobenzene until the liquid runs away clear and then further worked up in the usual way. The dye of the formula:

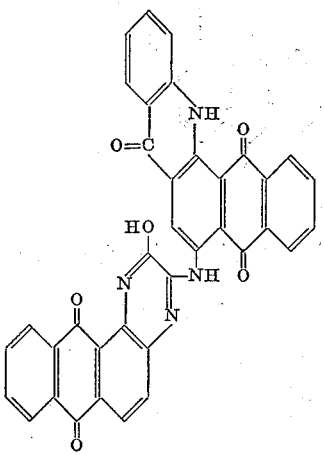

is obtained in a good yield; it dyes cotton grey shades from the vat with good fastness properties.

Instead of adding the nitrobenzene suspension of 4-amino-anthraquinonebenzene-acridone to the reaction mixture of the Pz - chlorohydroxypyrazino - anthraquinone, the reverse procedure may be followed and the mixture containing the Pz-chlorohydroxy-pyrazino-anthraquinone may be added to the nitrobenzene suspension of 2-amino-3,4-phthaloylacridone.

By using 27.0 parts of 2-amino-3,4-phthaloyl-5,7-dichloroacridone or 24.7 parts of 2-amino-3,4-phthaloyl-6-chloroacridone instead of 22.5 parts of 2-amino-3,4-phthaloylacridone, the dyes of the formulae:

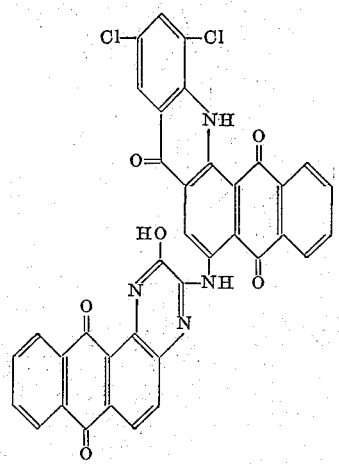

and

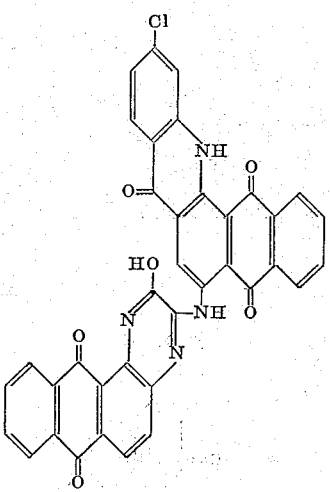

are obtained in good yields; they dye cotton grey shades from the vat.

*Example 3*

A mixture of 19.3 parts of Pz-dihydroxy-1,2-pyrazino-anthraquinone, 216 parts of anhydrous nitrobenzene, 7.3 parts of dimethyl formamide and 32 parts of thionyl chloride is stirred for an hour at 100° C. and then the excess thionyl chloride together with about 60 parts of nitrobenzene is distilled off under reduced pressure. An anhydrous suspension of 29.1 parts of 2-(1',4'-diamino-2'-anthraquinonyl)-5,6-phthaloyl-benzoxazole in 360 parts of nitrobenzene, which has previously been stirred for 1½ hours at 170° to 180° C. to improve the degree of dispersion, is added at about 50° to 60° C., the whole heated to 180° to 190° C. and stirred for five hours at this temperature. After cooling to 100° to 110° C. the product is filtered off at this temperature, washed with hot nitrobenzene at about 100° to 110° C. until the filtrate runs away clear and worked up in the usual way. The dye of the formula:

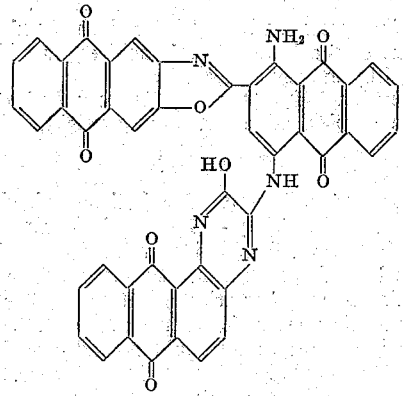

is obtained in a good yield; it dyes cotton from the vat grey shades with very good fastness properties.

Instead of adding the nitrobenzene suspension of the 2-(1',4' - diamino - 2' - anthraquinonyl) - 5,6 - phthaloyl-benzoxazole to the reaction mixture of Pz-chlorohydroxy-pyrazino-antharquinone, the reverse procedure may be adopted and the Pz-chlorohydroxypyrazino-anthraquinone added to the nitrobenzene suspension of the 2-(1',4'-diamino-2'-anthraquinonyl)-5,6-phthaloyl-benzoxazole.

By using 30 parts of 2-(1',4'-diamino-2'-anthraquinonyl)-5,6-phthaloylbenzothiazole instead of 29.1 parts of 2-(1',4' - diamino - 2' - anthraquinonyl) - 5,6 - phthaloyl-benzoxazole, the dye of the formula:

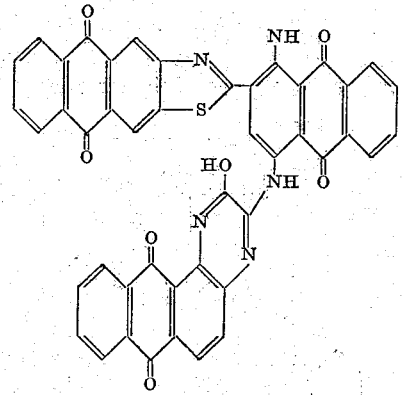

is obtained in a good yield; it dyes cotton grey shades with very good fastness properties from the vat.

*Example 4*

A mixture of 19.3 parts of Pz-dihydroxy-1,2-pyrazino-anthraquinone, 216 parts of anhydrous nitrobenzene, 7.3 parts of dimethylformamide and 32 parts of thionyl chloride is stirred for an hour at 100° C., the excess thionyl chloride together with about 60 parts of nitrobenzene distilled off under reduced pressure, and an anhydrous suspension of 24.5 parts of 2-amino-3,4-phthaloyl-5,7-dichloracridone in 360 parts of nitrobenzene added at about 50° to 60° C. The whole is heated to 180° to 190° C. and stirred at this temperature for another six hours. After cooling the mixture to about 100° to 110° C., the product is filtered off on a suction filter heated with steam at normal pressure, washed with hot nitrobenzene at about 90° to 110° C. until the filtrate runs away clear, and worked up as usual. The dye of the formula:

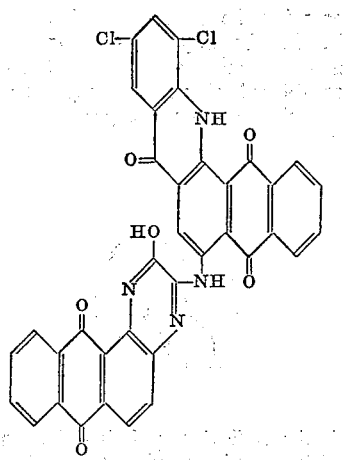

is obtained in a good yield; it dyes cotton grey shades with very good fastness properties from the vat.

By using 24.5 parts of 2-amino-3,4-phthaloyl-6,7-dichloroacridone or 22.5 parts of 2-amino-3,4-phthaloyl-6-chloroacridone or 22.5 parts of 2-amino-3,4-phthaloyl-7-chloroacridone instead of 24.5 parts of 2-amino-3,4-phthaloyl-5,7-dichloroacridone, analogous dyes are obtained which also dye cotton from the vat grey shades with very good fastness properties.

Example 5

A mixture of 19.3 parts of Pz-dihydroxy-1,2-pyrazinoanthraquinone, 216 parts of anhydrous nitrobenzene, 7.3 parts of dimethylformamide and 32 parts of thionyl chloride is stirred for an hour at 100° C., the excess thionyl chloride together with about 60 parts of nitrobenzene distilled off under reduced pressure and an anhydrous suspension of 22.9 parts of 2-(1',4'-diamino-2'-anthraquinonyl)-5-phenyl-1,3,4-oxidazole of the formula:

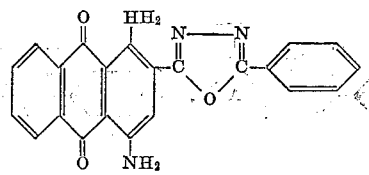

in 360 parts of nitrobenzene added. The whole is heated to 180° to 190° C., stirred for 6 hours at this temperature and worked up as described in Example 4. A dye is obtained in good yield which dyes cotton from the vat in grey shades with very good fastness properties.

Similar dyes which dye cotton from the vat in grey shades with very good fastness properties are obtained by using, instead of 22.9 parts of 2-(1',4'-diamino-2'-anthraquinonyl)-5-phenyl-1,3,4-oxidazole, 25 parts of 2-(1',4'-diamino-2'-anthraquinonyl)-5-(2' - chlorophenyl)-1,3,4-oxdiazole, 25 parts of 2-(1',4'-diamino-2'-anthraquinonyl)-5-(3'-chlorophenyl)-1,3,4-oxdiazole, 25 parts of 2 - (1',4' - diamino-2'-anthraquinonyl)-5-(4'-chlorophenyl)-1,3,4-oxdiazole, 30.7 parts of 2-(1',4'-diamino-2' - anthraquinonyl) - 5-(anthraquinonyl-2')-1,3,4-oxdiazole, 27 parts of 2-(1',4'-diamino-2'-anthraquinonyl)-5-(2',5'-dichlorophenyl)-1,3,5-oxdiazole, 27 parts of 2-(1',4'-diamino - 2' - anthraquinonyl)-5-(2',4'-dichlorophenyl)-1,3,4-oxdiazole, 27 parts of 2-(1',4'-diamino-2'-anthraquinonyl)-5-(3',4'-dichlorophenyl) - 1,3,4 - oxdiazole, 26 parts of 2-(3',4'-diamino-2'-anthraquinonyl)-5-(3'-methylphenyl)-1,3,4-oxdiazole, 26 parts of 2-(1',4'-diamino-2'-anthraquinonyl)-5-(4'-methylphenyl)-1,3,4-oxdiazole, or 21.1 parts of 2-(1,4,-diamino-2'-anthraquinonyl)-5-methyl-1,3,4-oxdiazole.

I claim:
1. The dye of the formula:

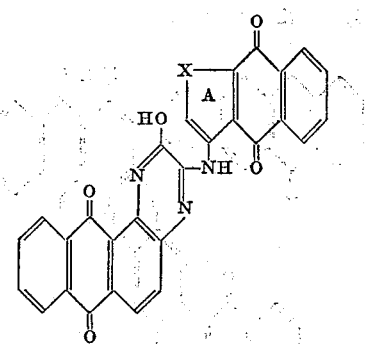

in which X is the radical completing the anthraquinone moiety A and being selected from the class consisting of

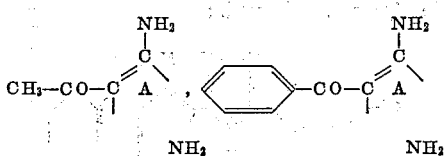

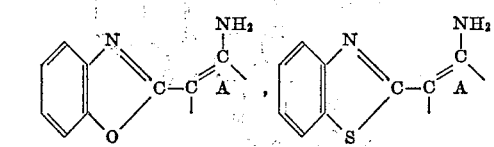

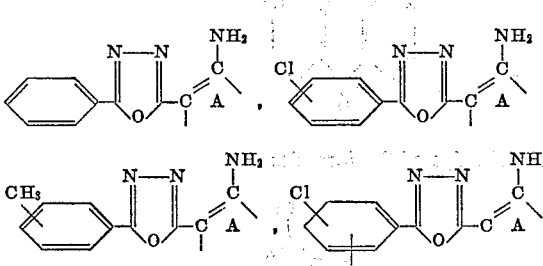

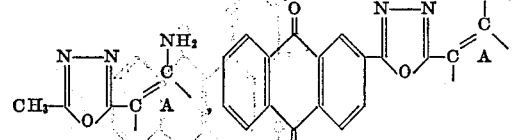

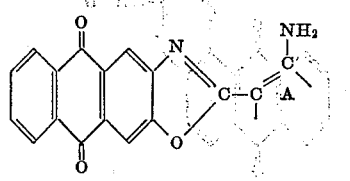

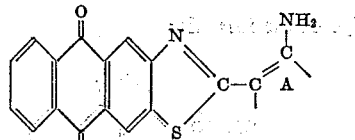

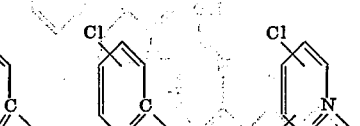

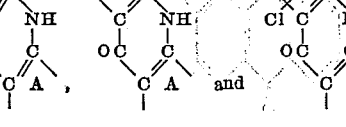

2. The dye of the formula:

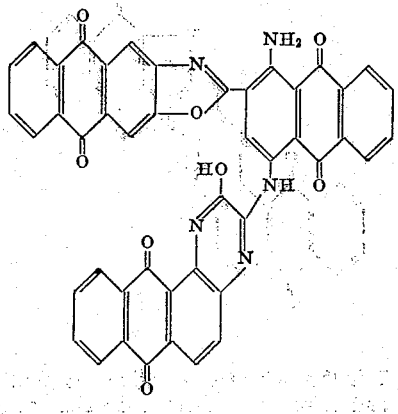

3. The dye of the formula:

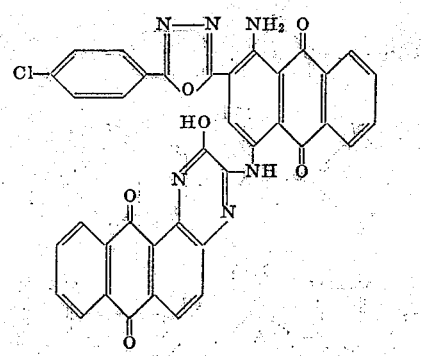

4. The dye of the formula:

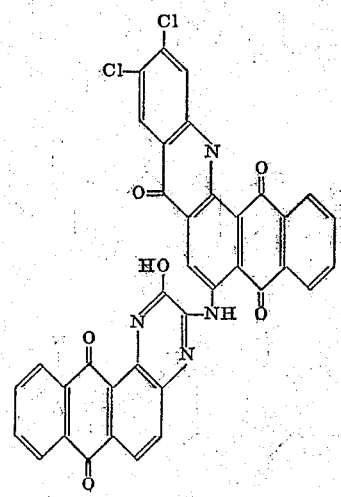

5. The dye of the formula:

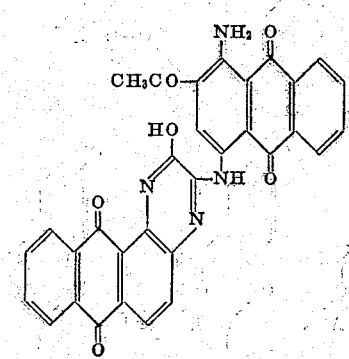

6. A process for the production of a vat dye which comprises heating Pz-dihydroxy-1,2-pyrazino-anthraquinone with a halogenating agent selected from the class consisting of thionyl chloride, phosphorus trichloride, phosphorus oxychloride and phosgene and an amine of the formula:

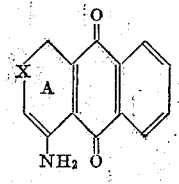

wherein X is the radical completing the anthraquinone moiety A and being selected from the class consisting of

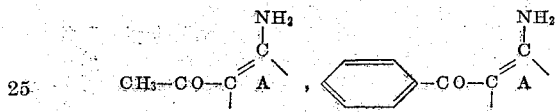

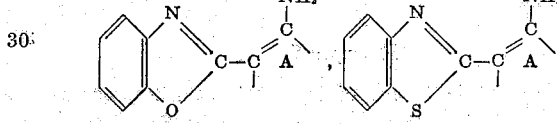

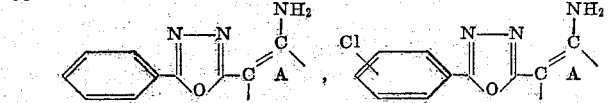

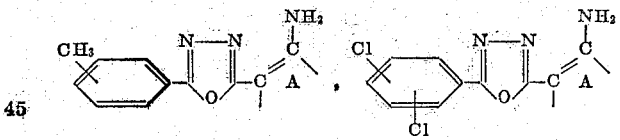

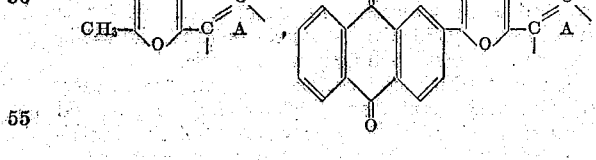

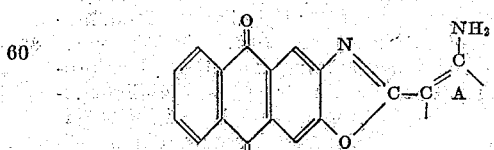

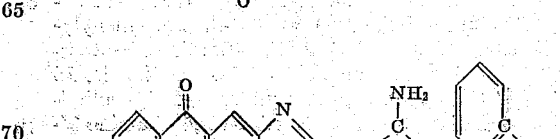

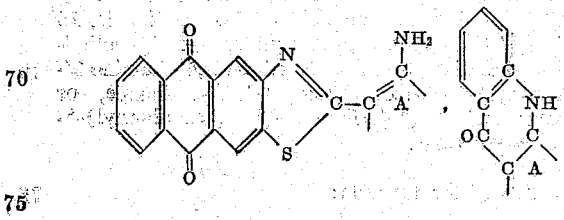

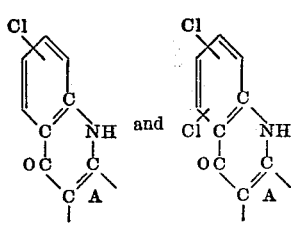
at a temperature of 40° C. to 200° C. and in the presence of a liquid selected from the class consisting of triethylamine, tri-n-propylamine, N-dimethylcyclohexylamine, pyridine, dimethylformamide, diethylformamide, formic acid morpholide, piperidide, N-methyl-pyrrolidone-(2) and N-ethyl-pyrrolidone-(2).
No references cited.
NICHOLAS S. RIZZO, *Primary Examiner.*